US009092408B2

(12) United States Patent
Theobald

(10) Patent No.: US 9,092,408 B2
(45) Date of Patent: Jul. 28, 2015

(54) DATA LISTENERS FOR TYPE DEPENDENCY PROCESSING

(75) Inventor: Dietmar Theobald, Karlsruhe (DE)

(73) Assignee: SAP SE, Walldorf (DE)

( * ) Notice: Subject to any disclaimer, the term of this patent is extended or adjusted under 35 U.S.C. 154(b) by 944 days.

(21) Appl. No.: 12/184,938

(22) Filed: Aug. 1, 2008

(65) Prior Publication Data

US 2009/0037577 A1 Feb. 5, 2009

Related U.S. Application Data

(60) Provisional application No. 60/953,964, filed on Aug. 3, 2007.

(51) Int. Cl.
| G06F 15/16 | (2006.01) |
| G06F 3/00 | (2006.01) |
| G01R 31/08 | (2006.01) |
| G06F 17/24 | (2006.01) |
| G06F 17/30 | (2006.01) |
| G06K 15/00 | (2006.01) |
| G06F 9/44 | (2006.01) |

(52) U.S. Cl.
CPC ........ *G06F 17/241* (2013.01); *G06F 17/30073* (2013.01); *G06F 8/73* (2013.01); *G06K 15/00* (2013.01)

(58) Field of Classification Search
CPC .............. G06K 15/00; G06K 15/1822; H04N 1/00068; H04N 2201/3288
USPC ............................ 345/764; 707/101; 709/200
See application file for complete search history.

(56) References Cited

U.S. PATENT DOCUMENTS

| 4,689,675 | A | * | 8/1987 | Tchorbajian et al. | 348/442 |
| 5,045,853 | A | * | 9/1991 | Astle et al. | 341/67 |
| 5,487,147 | A | * | 1/1996 | Brisson | 714/1 |
| 5,515,096 | A | * | 5/1996 | Fujimoto | 347/232 |
| 5,721,545 | A | * | 2/1998 | Poplevine | 341/100 |
| 5,740,445 | A | * | 4/1998 | Okuda | 707/829 |
| 5,761,510 | A | * | 6/1998 | Smith et al. | 717/124 |
| 5,805,779 | A | * | 9/1998 | Christopher et al. | 358/1.16 |
| 5,999,729 | A | * | 12/1999 | Tabloski et al. | 717/105 |
| 6,097,834 | A | * | 8/2000 | Krouse et al. | 382/137 |
| 6,257,774 | B1 | * | 7/2001 | Stack | 717/110 |

(Continued)

OTHER PUBLICATIONS

"A Program Annotation Facility for the Java Programming Language", *JSR-175 Public Draft Specification*, (2002-2003), 1-34.

(Continued)

*Primary Examiner* — Arvin Eskandarnia
*Assistant Examiner* — Margishi Desai
(74) *Attorney, Agent, or Firm* — Schwegman Lundberg & Woessner, P.A.

(57) ABSTRACT

A method and apparatus for data listeners for type dependency processing. An embodiment of a method for dependency processing of computer files includes receiving a data stream input at a scanner component, where the data stream input represents program elements of one or more computer files. A data stream of type definitions and type usages is generated, and the data type definitions and data type usages are provided as an input to a listening component. The listening component performs a listening function of filtering the type definition and type usage data, aggregating the type usage data, or echoing the data stream output, and an output is generated from the listening component.

26 Claims, 10 Drawing Sheets

(56) References Cited

U.S. PATENT DOCUMENTS

| | | | |
|---|---|---|---|
| 6,356,946 B1 | 3/2002 | Clegg et al. | |
| 6,463,352 B1* | 10/2002 | Tadokoro et al. | 700/169 |
| 6,567,815 B1 | 5/2003 | Rubin et al. | |
| 6,694,323 B2 | 2/2004 | Bumbulis | |
| 6,856,993 B1 | 2/2005 | Verma et al. | |
| 7,147,159 B2* | 12/2006 | Longacre et al. | 235/462.09 |
| 7,379,047 B2* | 5/2008 | Drucker et al. | 345/156 |
| 7,386,472 B1* | 6/2008 | Bogat | 705/23 |
| 7,487,112 B2* | 2/2009 | Barnes, Jr. | 705/26 |
| 7,502,995 B2* | 3/2009 | Takagi et al. | 715/234 |
| 7,650,346 B2* | 1/2010 | Henaire et al. | 707/690 |
| 2001/0010055 A1* | 7/2001 | Hirabayashi | 709/201 |
| 2001/0044797 A1* | 11/2001 | Anwar | 707/102 |
| 2002/0021296 A1* | 2/2002 | Tsuji et al. | 345/418 |
| 2002/0049650 A1* | 4/2002 | Reff | 705/29 |
| 2002/0051015 A1* | 5/2002 | Matoba | 345/764 |
| 2002/0188597 A1* | 12/2002 | Kern et al. | 707/1 |
| 2003/0014529 A1* | 1/2003 | Simpson et al. | 709/229 |
| 2003/0037027 A1* | 2/2003 | Linhart | 707/1 |
| 2003/0069948 A1* | 4/2003 | Ma et al. | 709/220 |
| 2003/0227944 A1* | 12/2003 | Nierzwick et al. | 370/503 |
| 2004/0093329 A1 | 5/2004 | Bergen et al. | |
| 2004/0117673 A1* | 6/2004 | Arabi et al. | 713/300 |
| 2004/0120571 A1* | 6/2004 | Duvdevani et al. | 382/149 |
| 2004/0130742 A1* | 7/2004 | Horst | 358/1.13 |
| 2004/0249805 A1 | 12/2004 | Chuvilskiy | |
| 2004/0252700 A1* | 12/2004 | Anandakumar et al. | 370/395.21 |
| 2004/0267732 A1 | 12/2004 | Luk et al. | |
| 2005/0015797 A1* | 1/2005 | Noblecourt et al. | 725/32 |
| 2005/0033740 A1 | 2/2005 | Cao et al. | |
| 2005/0044432 A1* | 2/2005 | Park | 713/300 |
| 2005/0055338 A1* | 3/2005 | Warner et al. | 707/3 |
| 2005/0131867 A1 | 6/2005 | Wilson | |
| 2005/0136949 A1* | 6/2005 | Barnes, Jr. | 455/461 |
| 2005/0143655 A1* | 6/2005 | Satoh | 600/443 |
| 2005/0147381 A1* | 7/2005 | Koike et al. | 386/52 |
| 2005/0182824 A1* | 8/2005 | Cotte | 709/217 |
| 2005/0216445 A1 | 9/2005 | Rao | |
| 2005/0238260 A1* | 10/2005 | Coleman et al. | 382/313 |
| 2005/0251040 A1* | 11/2005 | Relkuntwar et al. | 600/437 |
| 2005/0257275 A1* | 11/2005 | Ooba | 726/28 |
| 2005/0262119 A1* | 11/2005 | Mawdsley | 707/100 |
| 2006/0001645 A1* | 1/2006 | Drucker et al. | 345/156 |
| 2006/0004810 A1* | 1/2006 | Atkin et al. | 707/101 |
| 2006/0083394 A1* | 4/2006 | McGrath | 381/309 |
| 2006/0143027 A1* | 6/2006 | Jagannathan et al. | 705/1 |
| 2006/0143028 A1* | 6/2006 | Altmann et al. | 705/1 |
| 2006/0155725 A1* | 7/2006 | Foster et al. | 707/100 |
| 2006/0233525 A1* | 10/2006 | Shibata et al. | 386/95 |
| 2007/0002971 A1* | 1/2007 | Purnhagen et al. | 375/316 |
| 2007/0011683 A1* | 1/2007 | Helander | 718/104 |
| 2007/0019815 A1* | 1/2007 | Asada et al. | 381/58 |
| 2007/0106811 A1* | 5/2007 | Ryman | 709/230 |
| 2007/0153731 A1* | 7/2007 | Fine | 370/329 |
| 2007/0179781 A1* | 8/2007 | Villemoes | 704/211 |
| 2007/0183688 A1* | 8/2007 | Hollfelder | 382/305 |
| 2007/0216946 A1* | 9/2007 | Tatsumi | 358/1.15 |
| 2007/0233895 A1* | 10/2007 | Ramachandran et al. | 709/238 |
| 2007/0253561 A1* | 11/2007 | Williams et al. | 381/58 |
| 2007/0255963 A1* | 11/2007 | Pizano et al. | 713/189 |
| 2008/0013540 A1* | 1/2008 | Gast | 370/392 |
| 2008/0027567 A1* | 1/2008 | Philyaw | 700/40 |
| 2008/0066052 A1* | 3/2008 | Wolfram | 717/109 |
| 2008/0069125 A1* | 3/2008 | Reed et al. | 370/410 |
| 2008/0091762 A1* | 4/2008 | Neuhauser et al. | 709/201 |
| 2008/0104633 A1* | 5/2008 | Noblecourt et al. | 725/32 |
| 2008/0112564 A1* | 5/2008 | Vanderstraeten | 380/243 |
| 2008/0228924 A1* | 9/2008 | Herberger et al. | 709/227 |
| 2008/0273716 A1* | 11/2008 | Saito et al. | 381/93 |
| 2008/0307240 A1* | 12/2008 | Dahan et al. | 713/320 |
| 2009/0037577 A1* | 2/2009 | Theobald | 709/224 |
| 2009/0144624 A1* | 6/2009 | Barnes, Jr. | 715/719 |
| 2009/0254572 A1* | 10/2009 | Redlich et al. | 707/10 |
| 2009/0259612 A1* | 10/2009 | Hanson | 706/47 |
| 2010/0250497 A1* | 9/2010 | Redlich et al. | 707/661 |

OTHER PUBLICATIONS

"Getting Started with the Annotation Processing Tool (apt)", http://java.sun.com/j2se/1.5.0/docs/guide/apt/GettingStarted.html. (2004), 1-8.

"Package—Java 2 Platform Standard Edition Version 1.4.2", http://java.sun.com/j2se/1.4.2/docs/api/java/io/package-summary.html, (2003), 1-6.

Gosling, James, et al., "The Java Language Specification Third Edition", *Addison Wesley-*, (May 2005), 259-286 & 356-358.

USPTO, "6570P471 OA Mailed Oct. 29, 2008 for U.S. Appl. No. 11/648,065", (Oct. 29, 2008), Whole Document.

* cited by examiner

DATA LISTENERS FOR TYPE DEPENDENCY PROCESSING

RELATED APPLICATIONS

This application is related to and claims priority to U.S. provisional patent application 60/953,964, filed Aug. 3, 2007. This application is further related to:

U.S. patent application Ser. No. 11/648,065, entitled "Computer File System Traversal", filed Dec. 30, 2006;

U.S. patent application Ser. No. 12/184,896, entitled "Computer Archive Traversal", filed Aug. 1, 2008, claiming priority to U.S. provisional application 60/953,932, filed Aug. 3, 2007, and issued as U.S. Pat. No. 8,463,724 on Jun. 11, 2013;

U.S. patent application Ser. No. 12/184,904, entitled "Computer File Processing", filed Aug. 1, 2008, claiming priority to U.S. provisional application 60/953,933, filed Aug. 3, 2007;

U.S. patent application Ser. No. 12/184,911, entitled "Annotation Processing of Computer Files", filed Aug. 1, 2008, claiming priority to U.S. provisional application 60/953,935, filed Aug. 3, 2007;

U.S. patent application Ser. No. 12/184,915, entitled "Annotation Data Filtering of Computer Files", filed Aug. 1, 2008, claiming priority to U.S. provisional application 60/953,937, filed Aug. 3, 2007, and issued as U.S. Pat. No. 8,806,324 on Aug. 12, 2014;

U.S. patent application Ser. No. 12/184,924, entitled "Annotation Data Handlers for Data Stream Processing", filed Aug. 1, 2008, claiming priority to U.S. provisional application 60/953,938, filed Aug. 3, 2007; and U.S. patent application Ser. No. 12/184,932, entitled "Dependency Processing of Computer Files", filed Aug. 1, 2008, claiming priority to U.S. provisional application 60/953,963, filed Aug. 3, 2007, and issued as U.S. Pat. No. 8,112,388 on Feb. 7, 2012.

TECHNICAL FIELD

Embodiments of the invention generally relate to the field of computer systems and, more particularly, to a method and apparatus for data listeners for type dependency processing.

BACKGROUND

In the formation of computer files, there may be certain data type dependencies in place. For example, any Java class file has a particular defined Java class type. The data type of a file may define many features of a computer file of that data type. In the analysis of software artifacts, knowledge regarding data type dependency can be helpful in analyzing relationships between the artifacts.

However, to understand the data type dependencies it is generally necessary to search through the relevant computer files to determine what data type dependencies are present. This process can take a significant amount of time because the data type definitions may be scattered throughout the files. For example, the class of each Java class file is provided in the class file, thus requiring that each class file be examined to make any determinations regarding data type occurrences in the computer files.

SUMMARY OF THE INVENTION

A method and apparatus are provided for data listeners for type dependency processing.

In a first aspect of the invention, an embodiment of a method for dependency processing of computer files includes receiving a data stream input at a scanner component, where the data stream input represents program elements of one or more computer files. A data stream of type definitions and type usages is generated, and the data type definitions and data type usages are provided as an input to a listening component. The listening component performs a listening function of filtering the type definition and type usage data, aggregating the type usage data, or echoing the data stream output, and an output is generated from the listening component.

In a second aspect of the invention, an embodiment of a type dependency processing system includes a data scanning module, with the data scanning module receiving a data stream input containing multiple program elements. The data scanning module scans the data stream input to identify data type definitions and usages of the data types. The system further includes a data listening module, where the data listening module is to receive the identified data type definitions and data type usages. The data listening module is either a configurable filter to filter out certain data type definitions and data type usages, an aggregator to aggregate data type usages, or an echo mechanism to echo the data type definitions and data type usages.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
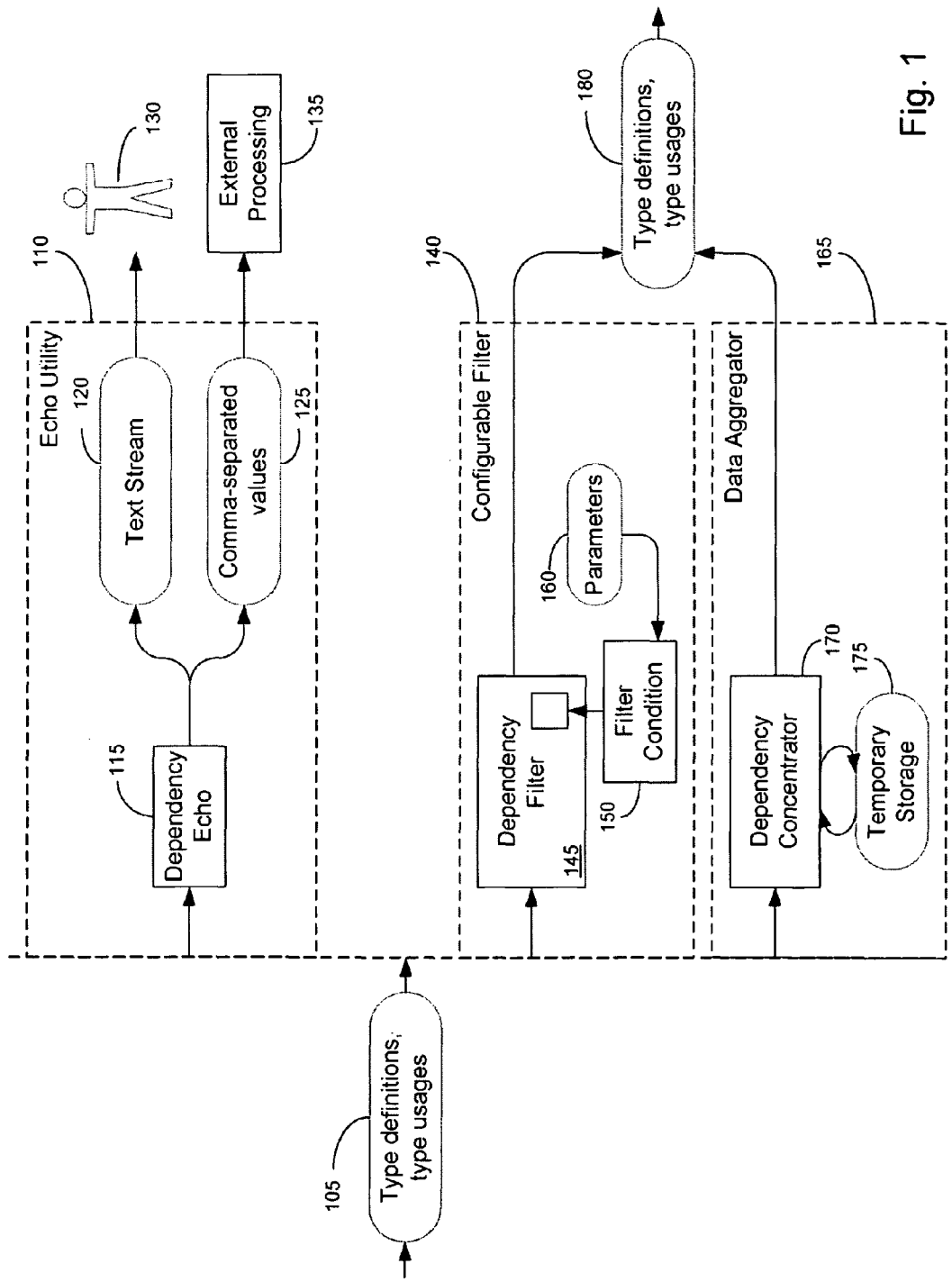
FIG. 1 is an illustration of embodiments of data listeners for type dependency processing.

Embodiments of the invention are generally directed to data listeners for type dependency processing.

As used herein:

"Data type" means a classification of a computer file. Data type includes, but is not limited to, a type of a Java class file.

"Computer file" means any file structure used in a computer system. Computer files include files with specific required structures, including Java class files.

"Class file" means a Java class file. A Java class file is a defined format for compiled Java code, which may then be loaded and executed by any Java virtual machine. The format and structure for a Java class file is provided in JSR 000202, Java Class File Specification Update (Oct. 2, 2006) and subsequent specifications.

"Traversal" means a process for progressing through the elements of a computer system, including a process for progressing through the elements of a computer archive.

"Archive" means a single file that may contain one or more separate files. An archive may also be empty. The files within an archive are extracted, or separated, from the archive for use by a computer program. The files contained within an archive are commonly compressed, and the compressed files are decompressed prior to use. An archive may further include data required to extract the files from the archives "Archive" may also refer to act of transferring one or more files into an archives.

In an embodiment of the invention, computer files are processed to identify data type occurrences and the usages of the data types. In an embodiment, the computer files are in the form of a serial data stream, with the data stream being scanned for data type definitions. In an embodiment, the processing utilizes one or more type dependency data listeners. In one embodiment, a set of computer files includes a set of Java class files. In an embodiment of the invention, computer files are extracted into a neutral format to allow efficient filtering of data types.

In an embodiment of the invention, a process is provided to receive a data stream input representing a computer program or other computer files, scan the data stream for data types, and to generate a data stream output. The data stream output includes identified data types and the usages of the data types. In an embodiment, the data stream output is generated by a type stream data listener.

In an embodiment of the invention, a processing system includes a scanning module to scan the data stream input and output a data stream that includes selected data types and data type usages. In an embodiment, the processing system further includes a listening module to manage the data stream output and potentially provide further filtering or other functions. In an embodiment, a file processing system may include additional listener modules to provide other functions. In one embodiment of the invention, a dedicated, independent processing module is provided for data type processing, but embodiments of the invention are not limited to a dedicated module implementation.

In an embodiment of the invention, a processing system includes one more listener modules for the processing of a data stream, with the listener modules including one or more of the following:

(1) A configurable dependency filter;
(2) A data aggregator; or
(3) An echo utility.

In an embodiment of the invention, a configurable dependency filter is a module that includes one or more filter parameters that establish a filter condition. The filter condition is imposed on a filter element. In an embodiment, the filter element receives a data stream of type definitions and type usages, and outputs a filtered data stream of type definitions and type usages. In an embodiment, the configurable dependency filter generates a serial data filter in the same format as the serial data input.

In an embodiment of the invention, a data aggregator provides for aggregation of dependency data over a sequence of class files in a data stream. In embodiment, the aggregator includes a dependency concentrator element and a temporary storage element. In an embodiment, the dependency concentrator operates to collect type usages from multiple occurrences of data types occurring in the data stream. Because the data arrives in a stream, the dependency concentrator operates in conjunction with a temporary storage that holds dependency data for concentration. In an embodiment, the data aggregator receives a data stream of type definitions and type usages, and outputs a concentrated data stream of type definitions and type usages in which data usages from multiple occurrences of a data type are combined. In an embodiment, the data aggregator generates a serial data filter in the same format as the serial data input.

In an embodiment of the invention, an echo utility is a module that echoes, or prints, the data elements of a data stream input so that the dependency data may be read or processed. In one embodiment, a dependency echo module produces a text stream output from a data stream input including type definitions and type usages, thereby providing a user with a readable output of dependency information. In a second embodiment, the dependency echo module produces dependency values in a form that may be provided to external processing, including, but not limited, comma-separated type definition and usage values or another common format.

In an embodiment of the invention, the configurable dependency filter and the data aggregator both receive data stream input of type definition and type usage data, and produce a data stream output of type definition and type usage data. In an embodiment, the input format and the output format are the same for both the configurable dependency filter and the data aggregator. In this manner, multiple dependency listener modules may be placed in series. In one example, a data stream input may be received by a dependency filter, which filters out unwanted dependency data and produces a filtered data stream output of type definitions and type usages. The filtered data stream output then may be utilized as a data stream input for a dependency concentrator module, which produces an aggregated data stream output that has aggregated types usages with common type definitions. The aggregated data stream may then be utilized as a data stream input for an echo utility, which may convert the data stream into a text stream output for user analysis or into a form for external processing.

In an embodiment of the invention, a set of computer files are scanned in a single pass as a serial data stream without requiring multiple readings of the file data. In an embodiment, the same serial data stream format is maintained both on input and output, thereby allowing further processing of computer files without further file conversion.

In an embodiment, the conversion of the data into a data stream allows processing without any dependency on random access files, and broadens the applicable scope of the process for the input. In an embodiment, the processing of class files as a data stream allows processing without requiring use of, for example, Java library utilities that may normally be required to conduct the file processing.

In an embodiment of the invention, the conversion of computer files to a data stream allows for the use of a protocol for both the data producer (the computer file processor) and the data consumer without creating a complete file representation, thereby simplifying the data structure. In an implementation for Java class files, the processing system operates with a class file data model, without requiring the addition of any major abstraction for data processing.

In an embodiment, the conversion of computer files to a serial data format may include, but is not limited to, the operation of a traversal of a hierarchical data structure or of a data archive as provided respectively in patent application Ser. No. 11/648,065, entitled "Computer File System Traversal", filed Dec. 30, 2006. Other processes for conversion of a set of files to a serial data stream may also be utilized in embodiments of the invention.

In an embodiment of the invention, processing is designed to provide sufficient performance for overall computer file processing. For example, in an embodiment a system includes stream buffering to buffer data as it is obtained and processed. In addition, an embodiment of the invention provides a compact internal file state in the data stream, thereby minimizing the amount of data that will be required in the process of transferring and processing the computer files.

In an embodiment of the invention, a data scanner may be provided in multiple implementations, depending on the system requirements. A data scanner may be a portion of a file processor. In one example, native processing implementations may be provided for a computer file scanner, with the native implementations being based upon relevant Java standards. In another example, a non-native implementation may be provided, as required. A particular non-native implementation may include a BCEL (Byte Code Engineering Library) implementation, with the BCEL API being a toolkit for the static analysis and dynamic creation or transformation of Java class files.

In an embodiment of the invention, a data consumer that receives output data is a main framework expansion point for which neutral utility implementations might be required. In an embodiment of the invention, a file processor (the data producer) operates using the same data protocol as the data consumer protocol. In an embodiment of the invention, the data consumer may have control over the data to be provided to the data consumer. In an embodiment, the data producer and the data consumer may cooperate to agree on the data to be provided from the serial data stream. In an embodiment of the invention, a system may include complexity control, including configuring the file processor to deliver the data of interest. In an embodiment, the data of interest includes data meeting a certain degree of detail, or certain types of data. In an embodiment of the invention, the structure of the data processing may allow for a system to be utilized with loose semantics and implementation constraints. For example, the technical framework and protocol data types may be defined. However, there may be leeway for implementation characteristics, such as the result order sequence and analysis capabilities.

In an embodiment of the invention, file processing may be included within a set of tools that are provided to search files. The tools may, for example, provide for the conversion of files into serial form by a traversal process, the scanning of data for desired elements, and other related processes.

FIG. 1 is an illustration of embodiments of data listeners for type dependency processing. In an embodiment, a data listener receives a serial data stream of dependency data 105, including type definitions and type usages. The serial data stream may be received from a data scanner, which has scanned a data stream to identify data type definitions and type usages.

In first embodiment of the invention, the data listener may be an echo utility module 110 to produce data for examination by a user or for external processing. In this illustration, an echo utility includes a dependency echo element 115 to receive the contents of the data stream input 105 and to print such data to put the data in a form for examination or external processing. For example, the dependency echo element 115 may print the input data stream 105 into a text stream 120. The data of the text stream can then be provided to a user 130, who may analyze the data to reach conclusions regarding the original computer files. In a second example the dependency echo element 115 may print the data stream input 105 into, for example, comma separated values 125 that may be used in external processing 135.

In a second embodiment of the invention the data listener may be a configurable filter module 140. In this illustration, the filter module 140 includes a dependency filter 145 to filter out unwanted dependency data. The dependency filter 145 may operate based on a filter condition 150. The filter condition may utilize certain parameters 160 that may be set to establish filter operations. For example, the parameters may be derived from a configuration for the dependency listen module. The dependency filter 140 produces a data stream output 180, which in this embodiment is a filtered data stream in which unwanted dependency data has been filtered out.

In a third embodiment of the invention, the data listener may be a data aggregator 165 to aggregate type dependency data. In an embodiment, the data aggregator 165 includes a dependency concentrator 170 to gather type usages from throughout the files represented in the input data stream 105. The dependency concentrator 170 uses a temporary storage 175 to hold usage data as it is aggregated. The data aggregator 165 produces a data stream output 180, where the output is an aggregated version of the data stream input such that type usages for a data type are gathered together in the output.

Figure 2:
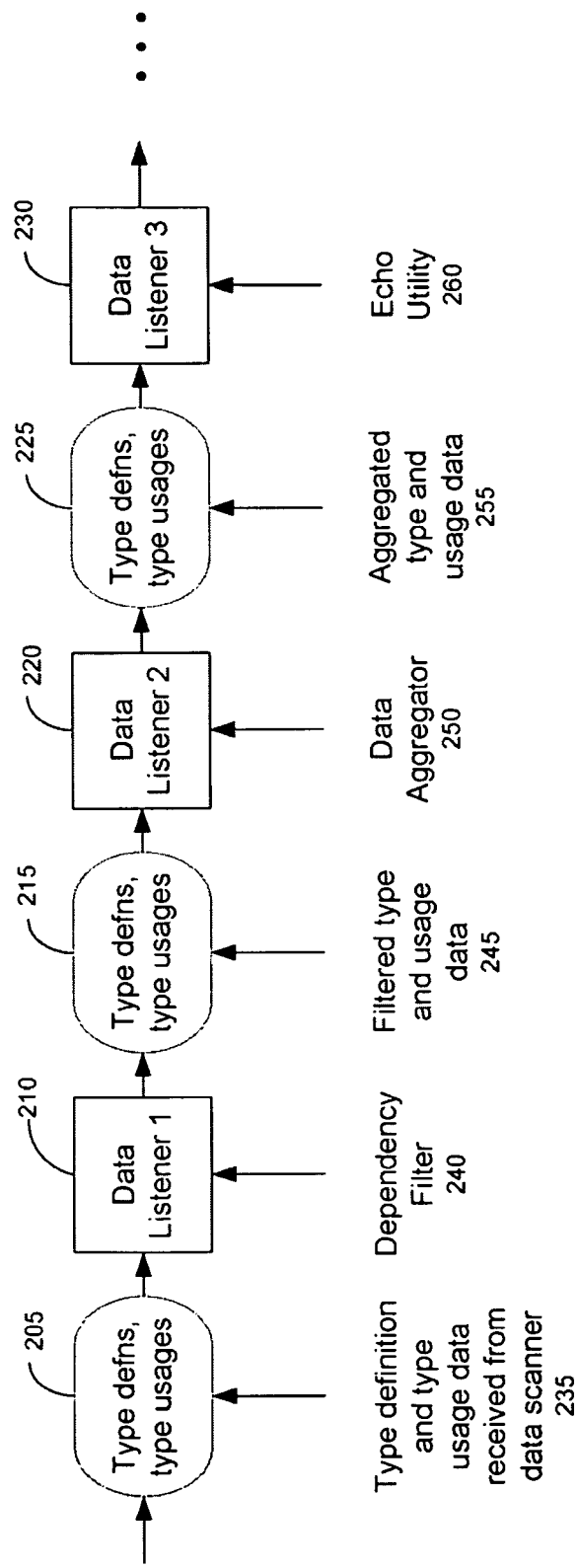
FIG. 2 is an illustration of an embodiment of a combination of listener modules for type dependency data stream processing.

FIG. 2 is an illustration of an embodiment of a combination of listener modules for type dependency data stream processing. In this illustration, multiple data listeners may be utilized in series to processing a received data stream. For example, a data stream of data type definitions and type usages 205 may be received, such as from a scanning module that is scanning a data stream for type dependency data. The data is received by a first listener module, data listener 1 210, which may, for example be a dependency filter 240, such as the configurable dependency filter 140 illustrated in FIG. 1. The data listener 1 240 produces a data stream output of type definitions and usage 215, which may represent a filtered data stream 245 in which unwanted data type definitions and type usages have been filtered out. The data stream output 215 becomes a data stream input for a second listener module, data listener 2 220. Data listener 2 220 may be, for example, a data aggregator 265 that concentrates dependency data, such as the data aggregator 165 of FIG. 1. Data listener 2 220 generates a data stream output of type definitions and type usages 225, which may contain aggregated type definition and type usage data 255 produced by the data aggregator 250. The data stream output 225 becomes a data stream input for data listener 3 230. Data listener 3 230 may represent an echo utility 260, such as the echo utility module 110 shown in FIG. 1. The echo utility 260 converts the data stream input 225 by printing such data, such as in the form of a text stream for a user or a stream of formatted (comma-separated) data for external processing.

Figure 3:
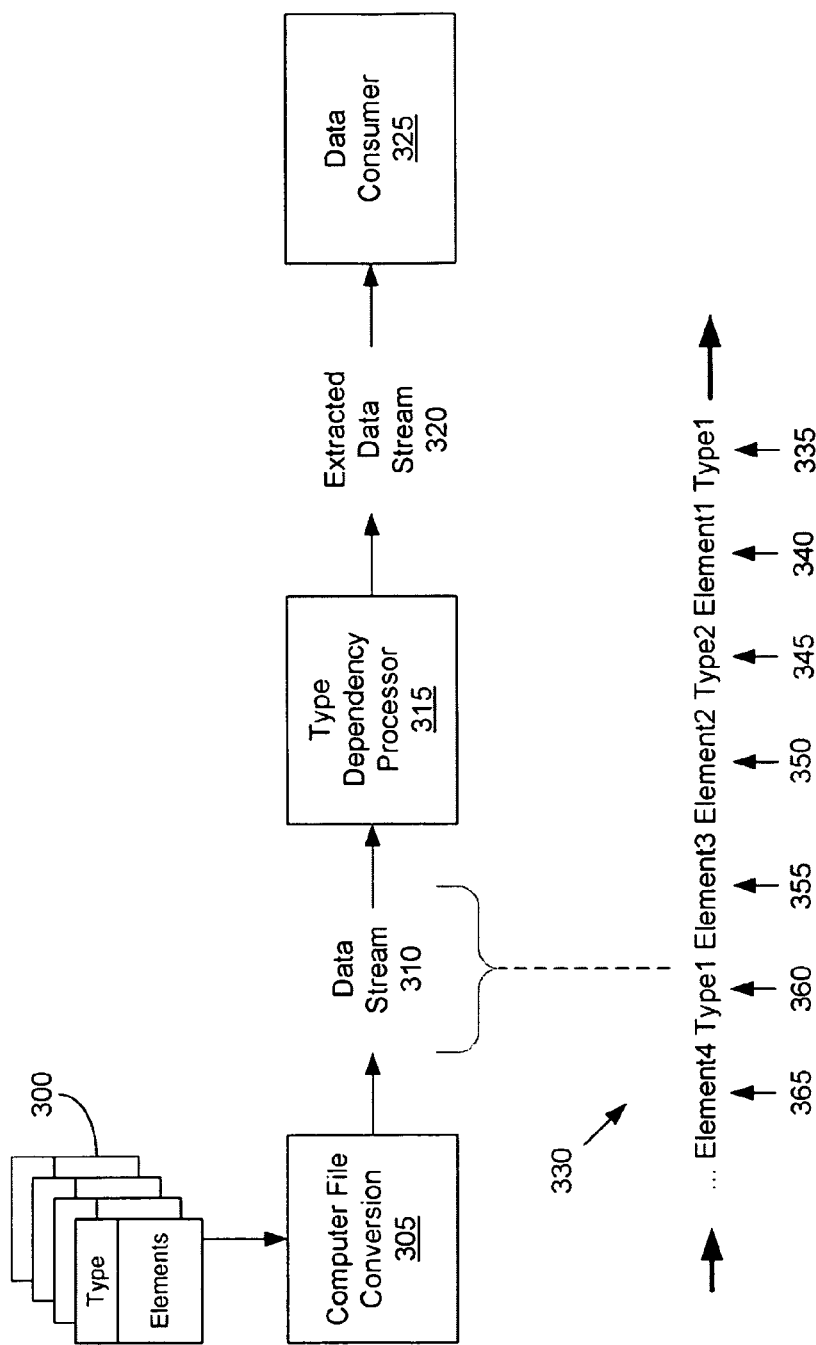
FIG. 3 is an illustration of an embodiment of processing of computer file data.

FIG. 3 is an illustration of an embodiment of processing of computer file data. In this illustration, a computer file conversion module 305 is provided to convert computer file data 300 into a serial data stream 310. The computer file data 300 may be, but is not limited to, Java class file program elements. The conversion of the computer file data may include, but is not limited to, the traversal of a hierarchical file or archive. The output of the processing of computer file data is a serial data stream 310 representing the computer file data.

In an embodiment, the serial data stream is a serial representation of the data type definitions and the data elements within each such data type. For example, the data stream 310 is illustrated as a series of program elements arriving as a data stream 330. In this data stream, there is a type definition prior to any elements within the type. For example, Type1 335 is a first type definition, which is followed by program element Element1 340 within Type1. The data stream further includes a second type definition Type2 345, which includes program elements Element2 350 and Element3 355. Further, Type1 360 is found again in the data stream, containing Element4 365.

In an embodiment of the invention, the serial data stream 310 then is provided to a type dependency processor 315, which processes the data, including scanning the data stream for data type definitions and the usages of each such data type. The processor 315 may contain multiple modules or sub-modules, depending on the particular embodiment. The processor 315 outputs an extracted data stream 320, which represents elements of the data stream that have been selected by the processor 315. In this implementation, the extracted data stream would contain data type definitions and associated usages of each such data type. The extracted data stream 320 then is eventually provided to a data consumer 325. The data consumer 325 may receive additional reports or data processing as required for the needs of the consumer 325.

Figure 4:
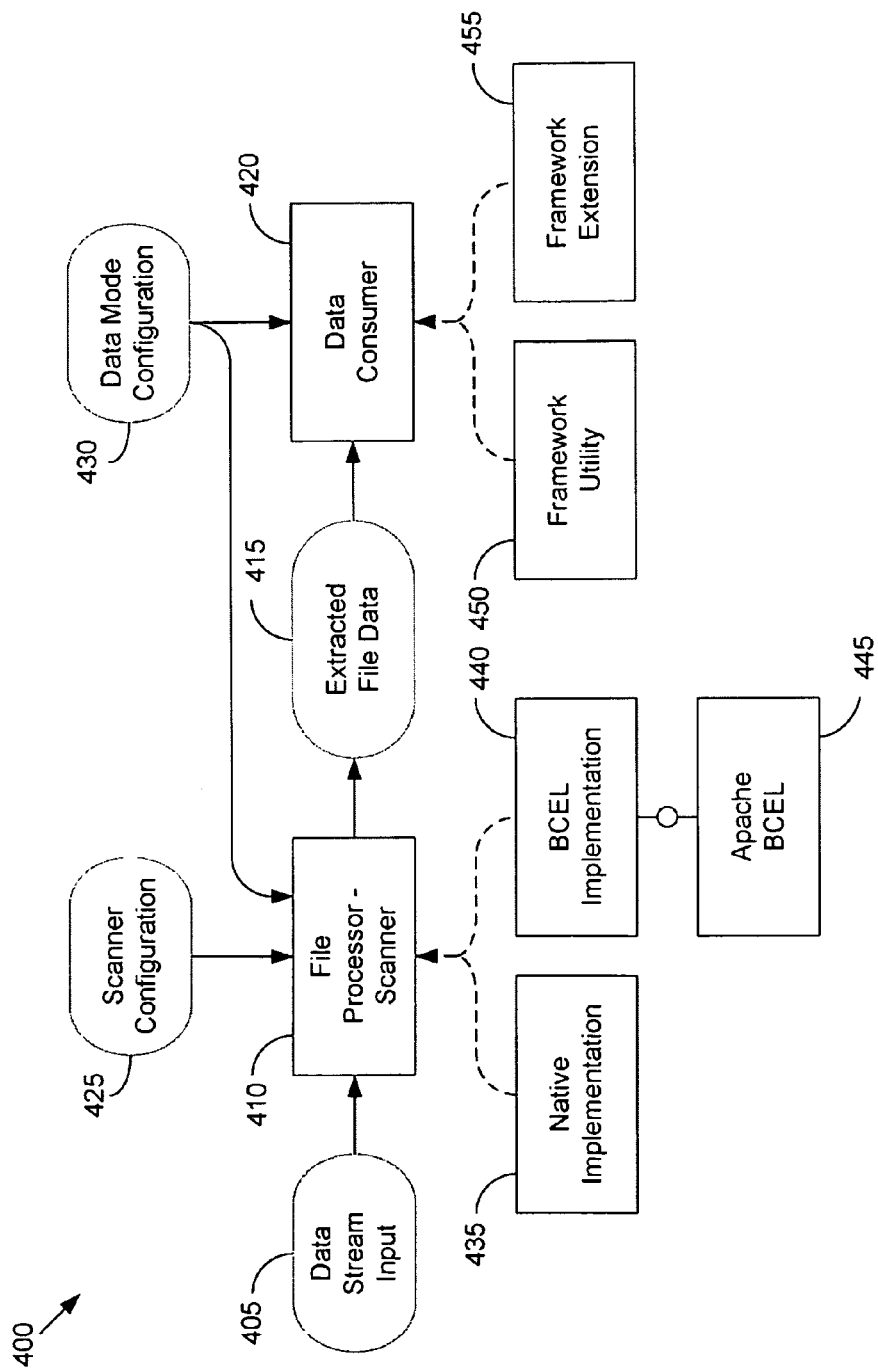
FIG. 4 is an illustration of a computer file processing system.

FIG. 4 is an illustration of a computer file processing system 400. While this illustration shows the processes occurring within a single system for simplicity in description, the processes may occur in multiple systems, including multiple systems within a network. In this illustration, a computer file data stream input 405 is provided to a file processor 410, which may include a scanner to scan the data for desired program elements. The data stream 405 may, for example, represent Java class file data that has been converted into a serial data stream. The file processor 410 may include multiple components, depending on the particular embodiment of the invention. The file processor 410 generates an extracted computer file data stream 415, which may be presented to a data consumer 420.

In an embodiment of the invention, the operation of the computer file processing system 400 is directed by certain inputs and settings. The operation of the file processor 410 may be directed by a scanner configuration 425. In addition, a data mode configuration 430 affects both the file processor 410 and the data consumer 420. The file processor 410 also may include one of multiple implementations. In particular embodiments, the implementation may be a native implementation 435 or a BCEL (Byte Code Engineering Library) implementation 440. The BCEL implementation 440 may include the Apache BCEL process 445, as developed by the Apache Software Foundation. In addition, the consumer 420 may utilize a framework utility 450 and a framework extension 455 in the operation of the computer file processing.

Figure 5:
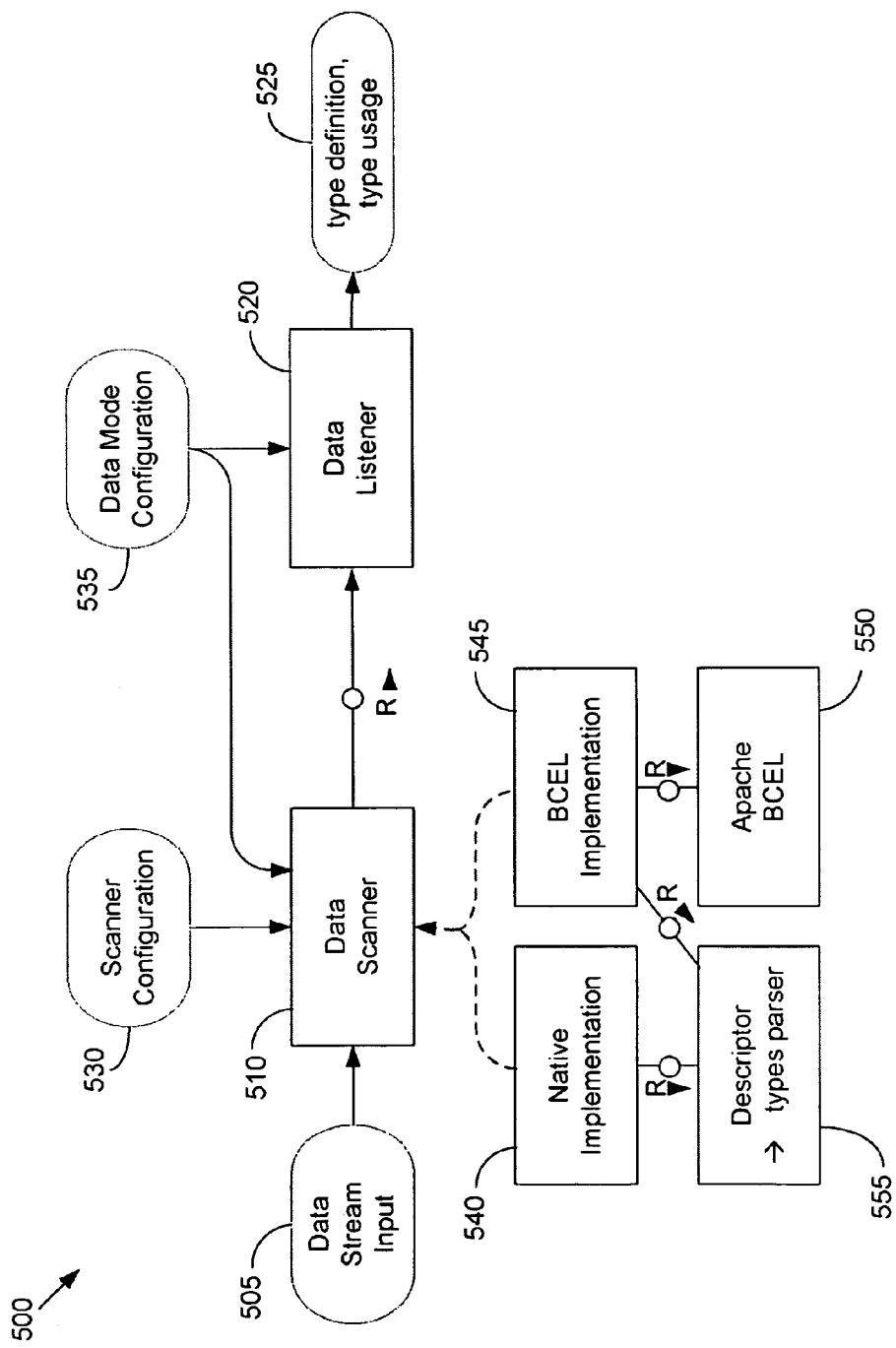
FIG. 5 is an illustration of an embodiment of a system to process annotated program elements.

FIG. 5 is an illustration of an embodiment of a system to process annotated program elements. The system 500 may include a data scanner 510 and a data handler 520. The data scanner 510 may, for example, represent the file processor 410 illustrated in FIG. 4 or a subpart of the file processor 410. The data handler 520 may represent the data consumer 420 illustrated in FIG. 4 or a subpart of the data consumer 410. In this illustration, the data scanner 510 is to scan a received data stream input 505 for data type definitions and usages of data types, and to produce a data stream containing selected data type definitions and usages. The data listener 520 is to receive and handle the output of the scanner 510.

The data scanner 510 may include a native implementation 540 and a BCEL implementation 545, illustrated with Apache BCEL 550. The implementations may be associated with a parsing module 555 to parse type descriptors and identify the appropriate data types.

Figure 6:
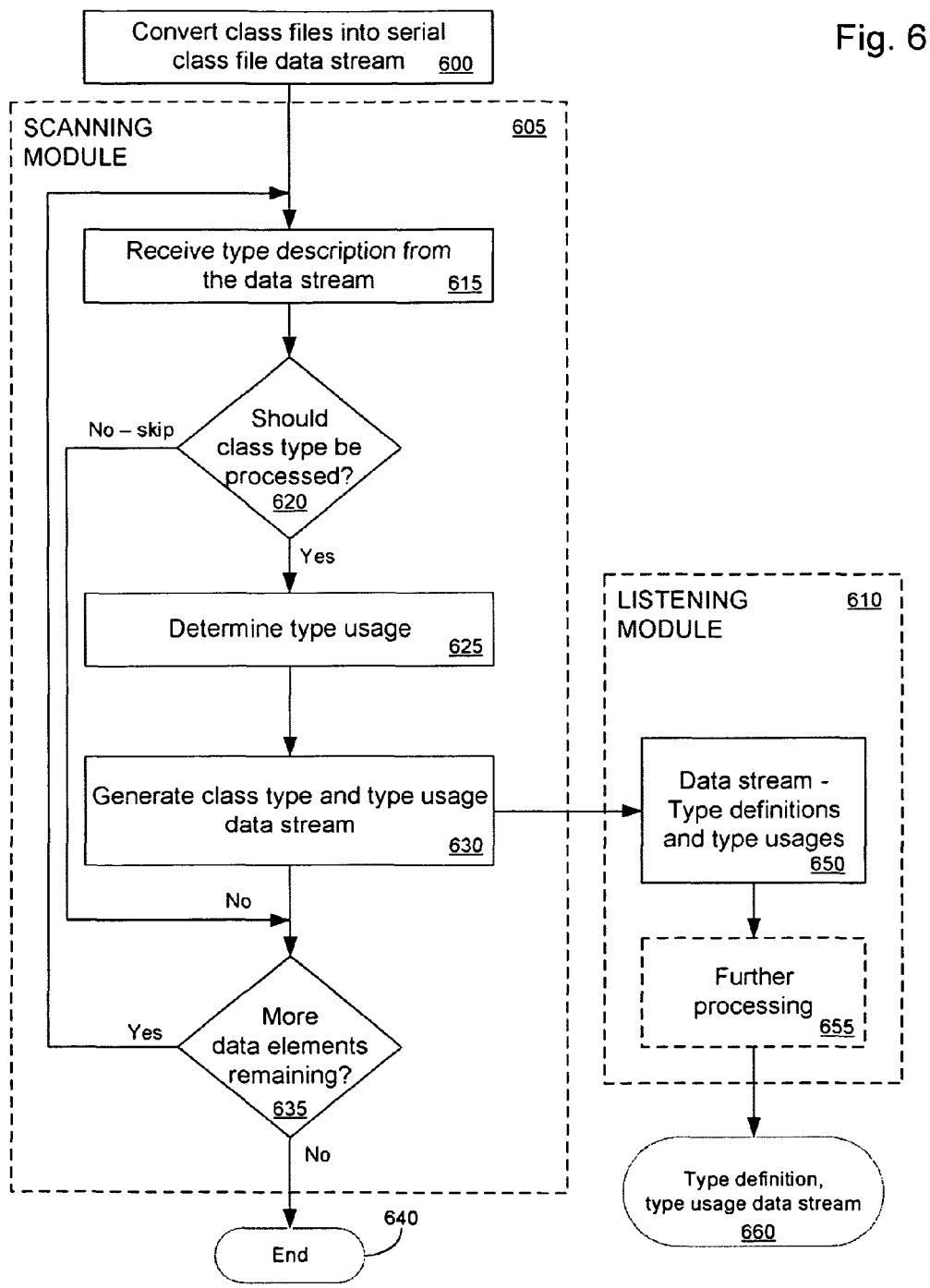
FIG. 6 is a flowchart to illustrate an embodiment of type dependency processing of class files.

FIG. 6 is a flowchart to illustrate an embodiment of type dependency processing of class files. In this illustration, a set of class files is converted into a serial class file data stream 600. The class file data stream may include, but is not limited to, a data stream generated through the traversal of a hierarchical file system or an archive.

The serial class file data stream 600 is received by a scanning module 605, which operates in conjunction with a listening module 610 to identify and output data type definitions and usages that are of interest in the data stream. In this process, a particular type description is received in the data stream 615. There is then a determination whether the elements of the class type should be processed 620. If the scanning module 605 determines that program elements in the class type should not be processed, then the elements in the class type are skipped and the process continues to a determination whether there are more program elements remaining 635. If the class is of interest, then the scanning module 605 determines the type usage or usages of the data type 625.

The scanning module then generates a class type and type data stream 630, and provides the listening module 610 with the identified type definitions and usages 650. If there are more program elements available in the data stream input, the scanning module continues with the next type description 615. When no more program elements remain in the received data stream, then the process ends 640. Within the listening module 610, there may be additional processing 655, including further filtering, as required. The output from the listening module 610 contains the selected type definitions and type usages. The processing of program elements may include other processes not illustrated here, depending on the embodiment of the invention.

Figure 7:
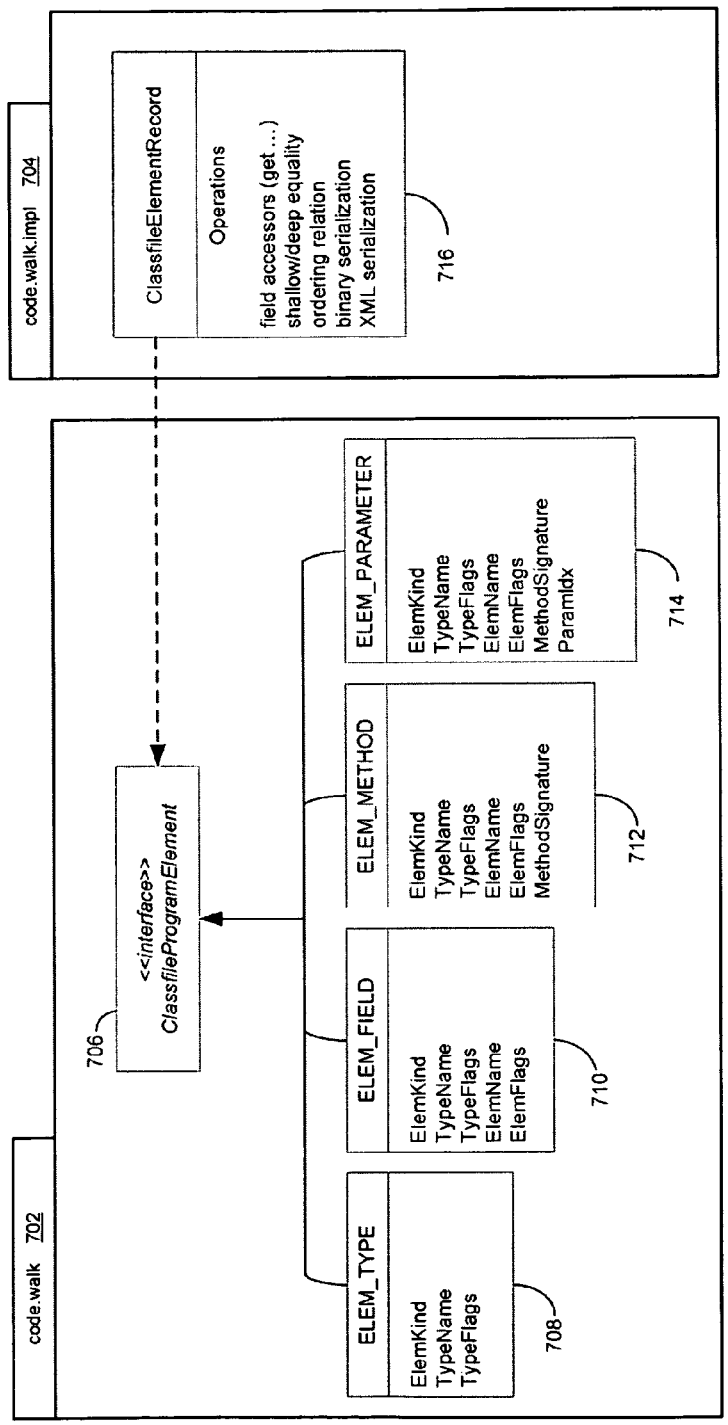
FIG. 7 is an illustration of an embodiment of a class file program element as a data stream.

FIG. 7 is an illustration of an embodiment of a class file program element as a data stream. In this illustration, a class file program element 706 is shown within a code walk module 702 (used in the traversal of class files). The class file program element 706 is represented by an element type 708 (including an element kind, type name, and type flags), an element field 710 (also including an element name and element flags), and one or more element methods 712 (also including a method signature), and an element parameter 714 (paramldx). The element further includes a class file element record 716 in the code walk implementation 704, including one or more operations (defining field accessors, shallow or deep equality, ordering relation, binary serialization, and XML serialization).

Figure 8:
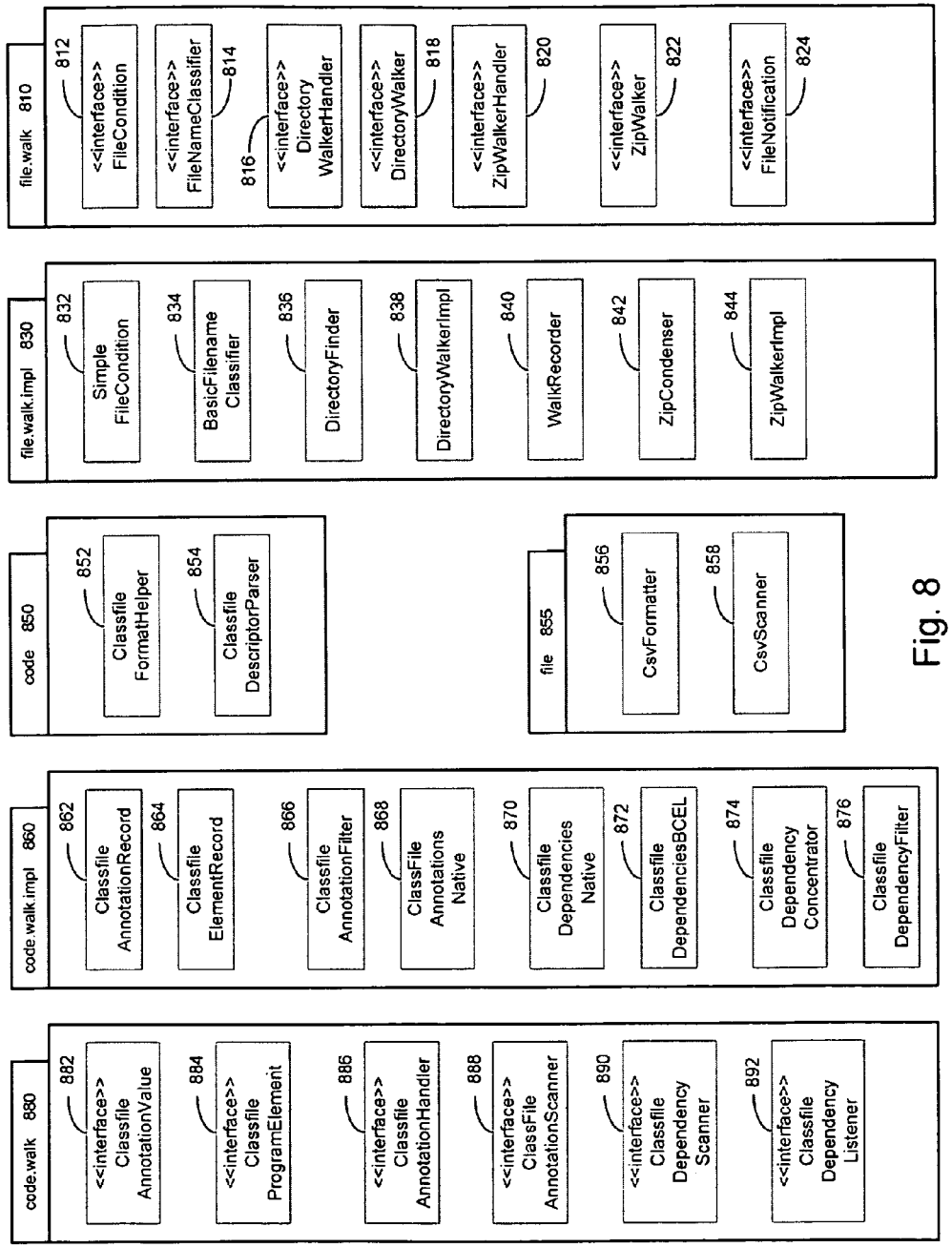
FIG. 8 illustrates an embodiment of library utilities.

FIG. 8 illustrates an embodiment of library utilities. FIG. 8 may illustrate software modules, hardware modules, or modules including a combination of software and hardware. In this illustration, the utilities relate to an interface layer comprising code walk interfaces (code.walk 880); for class file processing and file walk interfaces (file.walk 810) for locating files; and further to an implementation toolbox comprising code processing 850 and a code walk implementation (code.walk.impl 860) for class file processing, and file processing 855 and a file walk implementation (file.walk.impl 830) for locating files.

In the interface layer, the code walk interfaces 880 may include a class file annotation value interface module 882, a class file program element interface module 884, a class file annotation handler interface module 886, a class file annotation scanner interface module 888, a class file dependency scanner interface module 890, and a class file dependency listener interface module 892. The file walk interfaces then may include a file condition interface module 812, a file name classifier interface module 814, a directory walker handler interface module 816, a directory walker interface module 818, a zip walker handler interface module ("zip" indicating use for archives) 820, a zip walker interface module 822, and a file notification interface module 824.

In an embodiment of the invention, the code processing 850 may provide for parsing types from class file descriptors. Code processing 850 may include a class file format helper module 852 and a class file descriptor parser module. The code walk implementation 860 for class file processing may include a class file annotation record module 862, a class file element record module 864, a class file annotation filter 866, a class file annotation for native elements 868, a class file dependencies module for native elements 870, a class file dependencies module for BCEL (Byte Code Engineering Library) elements 872, a class file dependency concentrator module 874, and a class file dependency filter 876.

In an embodiment of the invention, the file processing 855 may include a comma separated value (CSV) formatter and a CSV scanner. The file walk implementation 830 for locating files may include a simple file condition module 832, a basic file name classifier module 834, a directory finder module 836, a directory walker implementation module 838, a walk recorder module 840, a zip (archive) condenser module 842, and a zip walker implementation module 844.

Figure 9:
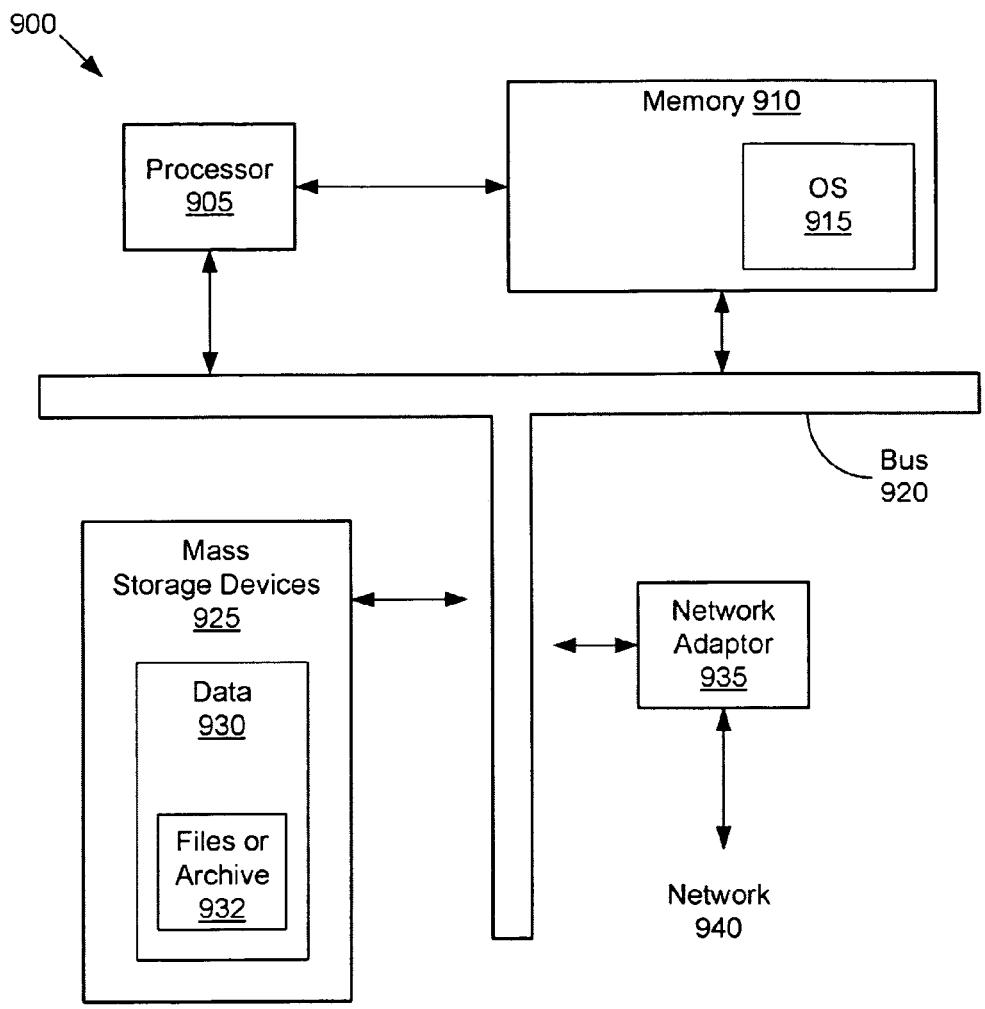
FIG. 9 is an illustration of a computer system in an embodiment of the invention.

FIG. 9 is an illustration of a computer system in an embodiment of the invention. The computer system may be utilized as a system for processing of computer files in the form of a data stream, or may represent one of multiple systems used in such processing. The computing system illustrated in FIG. 9 is only one of various possible computing system architectures, and is a simplified illustration that does include many well-known elements. As illustrated, a computing system 900 can execute program code stored by an article of manufacture. Computer system 900 may be a J2EE system, ABAP (Advanced Business Application Program) system of SAP AG, or administration system. A computer system 900 includes one or more processors 905 and memory 910 coupled to a bus system 920. The bus system 920 is an abstraction that represents any one or more separate physical buses, point-to-point connections, or both connected by appropriate bridges, adapters, or controllers. The bus system 920 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements thereto)

As illustrated in FIG. 9, the processors 905 are central processing units (CPUs) of the computer system 900 and control the overall operation of the computer system 900. The processors 905 execute software stored in memory 910. A processor 905 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 910 is or includes the main memory of the computer system 900. Memory 910 represents any form of random access memory (RAM), read-only memory (ROM), flash memory, or the like, or a combination of such devices. Memory 910 stores, among other things, the operating system 915 of the computer system 900.

Also connected to the processors 905 through the bus system 920 are one or more mass storage devices 925 and a network adapter 935. Mass storage devices 925 may be or may include any conventional medium for storing large volumes of instructions and data 930 in a non-volatile manner, such as one or more magnetic or optical based disks. In an embodiment of the invention, the mass storage devices may include storage of file or an archive 932 that requires processing. In an embodiment of the invention, the processors 905 may operate to traverse the files or archive 932, the traversal of the files or archive 932 resulting in output of a serial data stream representing selected elements of the archive. The processor 905 may scan the serial stream for desired program elements within the computer files. In another embodiment the computer system 900 may provide for the conversion of the computer files into a serial data stream, while another system or systems is responsible for scanning the data stream for desired program elements.

The network adapter 935 provides the computer system 900 with the ability to communicate with remote devices, over a network 940 and may be, for example, an Ethernet adapter. In one embodiment, the network adapter may be utilized to output data including, for example, an extracted serial data stream representing selected elements of the files or archive 932.

Figure 10:
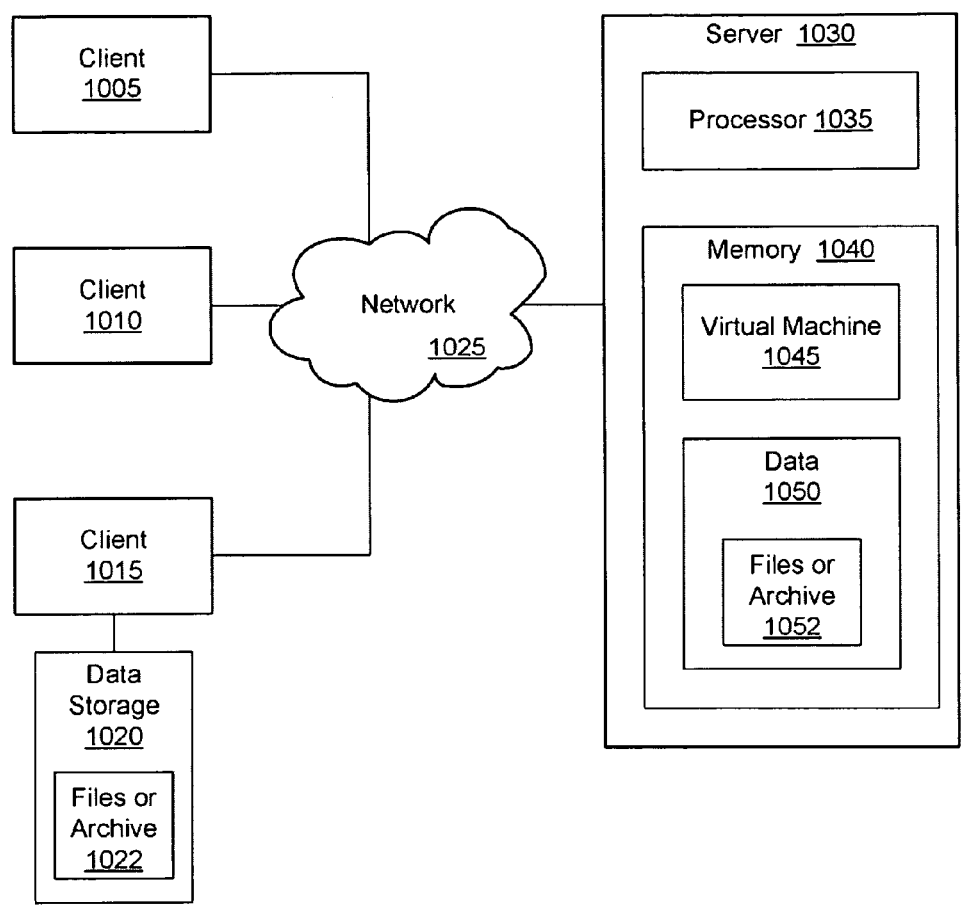
FIG. 10 illustrates an embodiment of a client-server network system.

FIG. 10 illustrates an embodiment of a client-server network system. As illustrated, a network 1025 links a server 1030 with client systems 1005, 1010, and 1015. Client 1015 may include certain data storage 1020, including computer files in the form of, for example, a computer file hierarchy or computer archive 1022. Server 1030 includes programming data processing system suitable for implementing apparatus, programs, and/or methods in accordance with one or more embodiments of the present invention. Server 1030 includes processor 1035 and memory 1040. Server 1030 provides a core operating environment for one or more runtime systems, including, for example, virtual machine 1045, at memory 1040 to process user requests. Memory 1040 may include a shared memory area that is accessible by multiple operating system processes executing in server 1030. For example, virtual machine 1045 may include an enterprise server (e.g., a J2EE-compatible server or node, Web Application Server developed by SAP AG, WebSphere Application Server developed by IBM Corp. of Armonk, N.Y., and the like). Memory 1040 can be used to store an operating system, a Transmission Control Protocol/Internet Protocol (TCP/IP) stack for communicating over network 1025, and machine executable instructions executed by processor 1035. The memory 1045 may also include data 1050 for processing, including the processing of data that includes data of one or more computer file hierarchies or computer archives 1052. In an embodiment, the data has been converted into a serial data stream for processing. In some embodiments, server 1035 may include multiple processors, each of which can be used to execute machine executable instructions.

Client systems 1005-1015 may execute multiple application or application interfaces. Each instance or application or application interface may constitute a user session. Each user session may generate one or more requests to be processed by server 1030. The requests may include instructions or code to be executed on a runtime system, such as virtual machine 1045 on server 1030.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method for dependency processing of computer files, the method comprising:
    receiving a data stream input at a scanner component that scans the data stream input to identify data types that are used by program elements in the data stream input, the data stream input representing a plurality of program elements of one or more computer files;
    using the scanner component to identify type usages of the program elements, each type usage identifying a usage of a corresponding data type that classifies data structures of the program elements in accordance with a corresponding type definition;
    generating a data stream comprising the type definitions and type usages corresponding to the program elements;
    providing the data stream comprising the type definitions and type usages as an input to a listening component, wherein the listening component performs one of the listening functions comprising:
        filtering the type definition and type usage data by evaluating a filter condition that filters out certain type definitions and type usages to produce a filtered data stream output in which the certain type definitions and type usages have been filtered out,
        aggregating type usage data for one or more type definitions by collecting the type usages for the data types to produce an aggregated data stream output in which the type usages from multiple occurrences of the data types are combined, or
        echoing the type definitions and type usages for access by one or more users or processors by identifying a print format associated with the one or more users or processors to produce an echoed data stream output that includes the type definitions and type usages in the print format; and
    generating an output from the listening component.

2. The method of claim 1, wherein the output from the listening component is a data stream having the same format as the input to the listening component.

3. The method of claim 2, where the listening function of the listening component is filtering the type definition and type usage data.

4. The method of claim 2, further comprising providing the output from the listening component as input to a second listening component.

5. The method of claim 1, wherein
    the listening function of the listening component is echoing the type definitions and type usages, and
    the output of the listening component is an echo of the input data to the listening component.

6. The method of claim 1, wherein the one or more computer files comprise Java class files and the program elements comprise Java class file program elements.

7. A type dependency processing system comprising:
    one or more processors with memory to perform operations for processor-implemented modules;
    a data scanning module that is implemented by the one or more processors with memory, the data scanning module to receive a data stream input containing a plurality of program elements and to scan the data stream input to identify data type definitions corresponding to the program elements and usages of the data types by the program elements, the data type definitions classifying data structures of the program elements; and
    a data listening module that is implemented by the one or more processors with memory, the data listening module to receive the identified data type definitions and data type usages in a data stream from the data scanning module, the data listening module including one of the following:
        a configurable filter that evaluates a filter condition to filter out certain data type definitions and data type usages to produce a filtered data stream output in which the certain data type definitions and data type usages have been filtered out,
        an aggregator to aggregate data type usages for one or more data type definitions by collecting the data type usages for the data types to produce an aggregated data stream output in which the data type usages from multiple occurrences of the data types are combined, or
        an echo mechanism to echo the data type definitions and data type usages for access by one or more users or processors by identifying a print format associated with the one or more users or processors to produce a echoed data stream output that includes the data type definitions and data type usages in the print format.

8. The system of claim 7, further comprising a second data listening module, wherein an output of the listening module is an input to the second listening module.

9. The system of claim 8, wherein a format of the output of the listening module is the same as the format of the input to the listening module.

10. The system of claim 7, wherein the data listening module includes the configurable filter, the configurable filter comprising one or more configurable parameters for a filter condition.

11. The system of claim 7, wherein the data listening module includes the aggregator, the aggregator comprising a concentrator element to aggregate type usages and a temporary storage to hold type usages during processing.

12. The system of claim 7, wherein the data listening module includes the echo mechanism, the echo mechanism producing a text stream for a user.

13. The system of claim 7, wherein the data listening module includes the echo mechanism, the echo mechanism producing text for external processing.

14. An article of manufacture comprising a non-transitory computer-readable medium including instructions that, when accessed by a processor, cause the computer to perform operations comprising:
  receiving a data stream input at a scanner component that scans the data stream input to identify data types that are used by program elements in the data stream input, the data stream input representing a plurality of program elements of one or more computer files;
  using the scanner component to identify type usages of the program elements, each type usage identifying a usage of a corresponding data type that classifies data structures of the program elements in accordance with a corresponding type definition;
  generating a data stream comprising the type definitions and type usages corresponding to the program elements;
  providing the data stream comprising the type definitions and type usages as an input to a listening component, wherein the listening component performs one of the following listening functions:
    filtering the type definition and type usage data by evaluating a filter condition that filters out certain type definitions and type usages to produce a filtered data stream output in which the certain type definitions and type usages have been filtered out,
    aggregating type usage data for one or more type definitions by collecting the type usages for the data types to produce an aggregated data stream output in which the type usages from multiple occurrences of the data types are combined, or
    echoing the type definitions and type usages for access by one or more users or processors by identifying a print format associated with the one or more users or processors to produce an echoed data stream output that includes the type definitions and type usages in the print format; and
  generating an output from the listening component.

15. The article of manufacture of claim 14, wherein the output from the listening component is a data stream having the same format as the input to the listening component.

16. The article of manufacture of claim 15, where the listening function of the listening component is either filtering the type definition and type usage data or aggregating the type usage data.

17. The article of manufacture of claim 15, wherein the medium further includes instructions that, when accessed by a processor, cause the computer to perform operations comprising:
  providing the output from the listening component as input to a second listening component.

18. The article of manufacture of claim 14, wherein
  the listening function of the listening component is echoing the type definitions and type usages, and
  the output of the listening component is an echo of the input data to the listening component.

19. The article of manufacture of claim 14, wherein the one or more computer files comprise Java class files and the program elements comprise Java class file program elements.

20. The method of claim 1, wherein the computer files include a hierarchical data structure or archive, and the method further comprises:
  traversing the hierarchical data structure or archive to provide a serial data format for the data stream input, the serial data format including a series of program elements with type identifiers that identify the data types corresponding to the program elements.

21. The system of claim 7, further comprising:
  an input generation module to generate the data stream input from a hierarchical data structure or archive by traversing the hierarchical data structure or archive to provide a serial data format for the data stream input, the serial data format including a series of program elements with type identifiers that identify the data types corresponding to the program elements.

22. The article of manufacture of claim 14, wherein the medium further includes instructions that, when accessed by a processor, cause the computer to perform operations comprising:
  generating the data stream input from a hierarchical data structure or archive by traversing the hierarchical data structure or archive to provide a serial data format for the data stream input, the serial data format including a series of program elements with type identifiers that identify the data types corresponding to the program elements.

23. The method of claim 1, wherein the data stream includes a serial arrangement of the type definitions and the type usages corresponding to the program elements, the serial arrangement identifying program elements that use corresponding type definitions.

24. The method of claim 1, wherein the data stream input comprises a serial data stream that includes the program elements.

25. The method of claim 1, wherein the program elements define computer-implemented operations on corresponding data types used by the program elements.

26. The method of claim 2, where the listening function of the listening component is aggregating the type usage data.

* * * * *